Feb. 5, 1957 H. TANIS 2,779,996
TOOL FOR INSTALLING TUBE LINERS
Filed Jan. 6, 1954 3 Sheets-Sheet 1
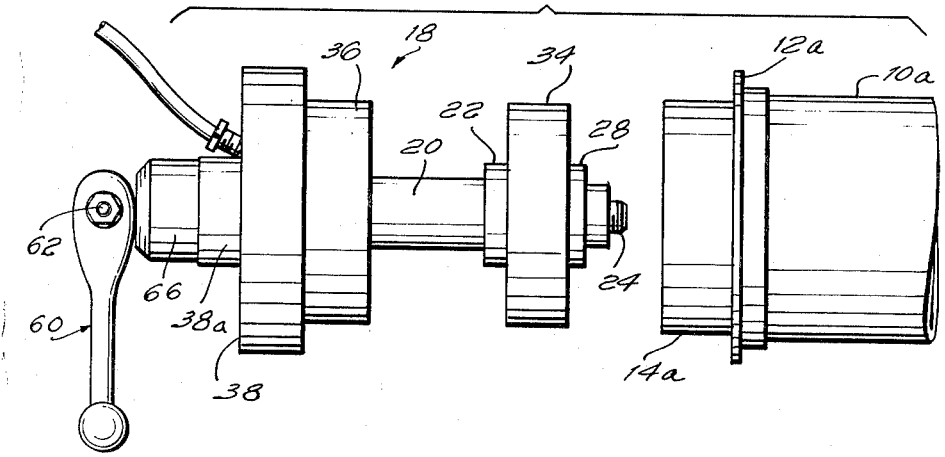
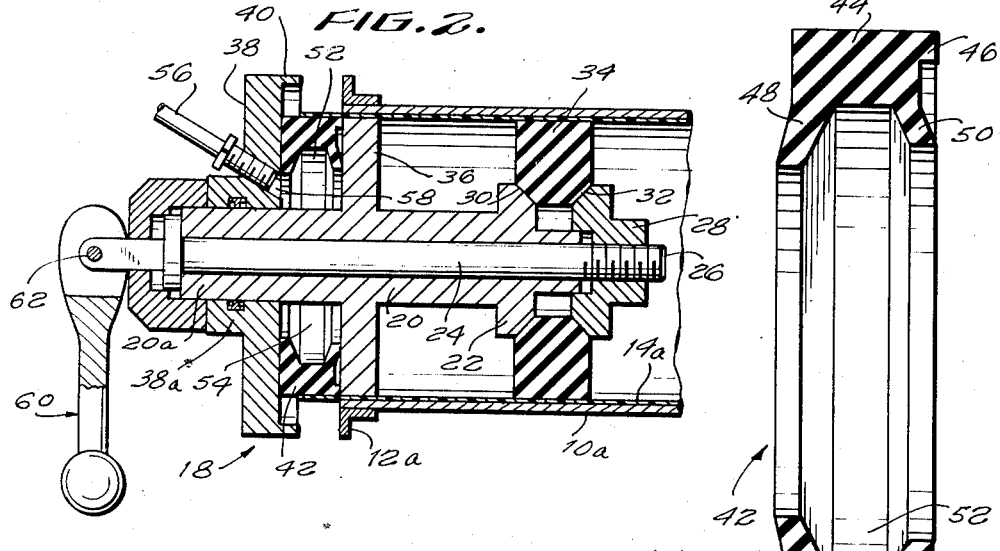
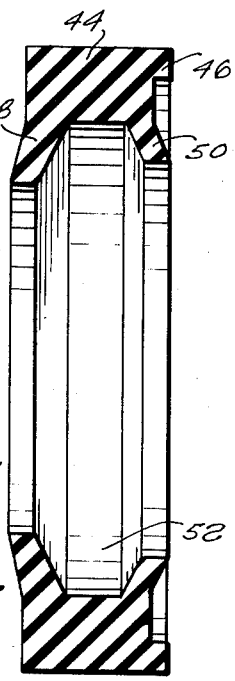
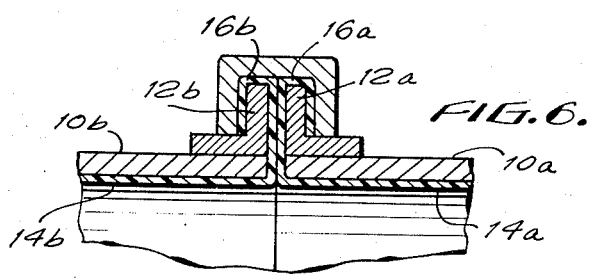

Feb. 5, 1957  H. TANIS  2,779,996
TOOL FOR INSTALLING TUBE LINERS
Filed Jan. 6, 1954  3 Sheets-Sheet 2

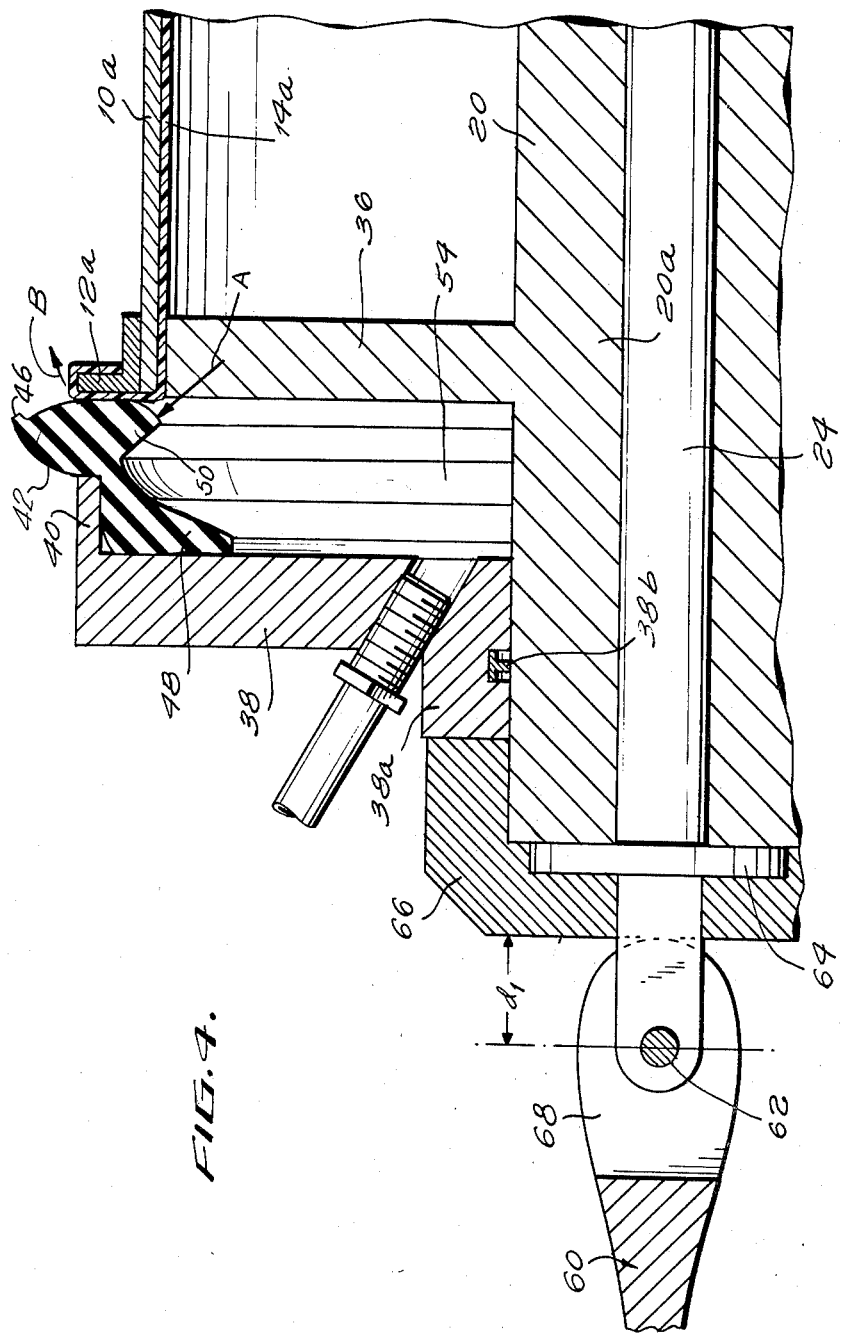

United States Patent Office 2,779,996
Patented Feb. 5, 1957

2,779,996

TOOL FOR INSTALLING TUBE LINERS

Henry Tanis, Hatfield, Pa., assignor to Greene, Tweed & Co., North Wales, Pa., a corporation of New York Application January 6, 1954, Serial No. 402,548

12 Claims. (Cl. 29—235)

The present invention relates generally to pipes or tubes formed of joined together sections and having tubular liners therein to prevent contamination or chemical attack of the interior surface of the pipe. More particularly, the invention is directed to a tool for engaging the end portions of the liner around the related ends of the pipe sections so that, when the sections are arranged in end-to-end abutting relationship to form a continuous conduit, the liner material protects the pipe sections at the joints therebetween as well as along the lengths of the sections.

In lined tubes or pipes of the described character, the several pipe sections are usually provided with outwardly directed radial flanges at their opposite ends for use in coupling together the sections. Heretofore, it has been necessary, after the liner has been inserted in a pipe section, to manually stretch the end portion of the liner projecting from an end of the pipe section so that the liner extends over the face of the adjacent radial flange and then to revert the stretched end portion of the liner over the outer edge of the flange. While the liner is usually formed of a resilient plastic material, such as, for example, polyethylene, such manual manipulation of the liner to engage the end portions thereof over the flanged ends of the pipe section is both time consuming and difficult as it is necessary to simultaneously maintain the liner in its desired position within the pipe section.

Accordingly, it is an object of the present invention to provide a tool for facilitating the engagement of the end portions of the liner around the flanged ends of the pipe section while securely holding the liner in fixed position with respect to the pipe section.

Another object is to provide a tool for the described purpose wherein the radial expansion of the end portion of the liner and the engagement of the expanded end portion around the adjacent flanged end of the pipe section is effected pneumatically.

Still another object is to provide a tool of the described character wherein a first resilient ring is mechanically expanded in the radial direction to bear against the liner at a location within the pipe section and thereby to position the tool with respect to the pipe section while holding the liner within the latter, a second resilient ring is spaced from the first ring and pneumatically expanded in the radial direction to expand the end portion of the liner across the face of the adjacent radial flange, and thereafter when the second ring has reached a certain degree of expansion the compressed air is released from under the second ring and directed against the expanded end portion of the liner to engage the latter around the outer edge of the radial flange.

A further object is to provide a tool having the foregoing characteristics wherein a single, manually actuated control member, in the form of a handle, is provided to control the expansion of the first resilient ring as well as the initial feeling of the space enclosed by the second resilient ring so that the latter can be pneumatically expanded by compressed air admitted to said space.

A still further object is to provide a tool of the described character which is of simple construction and easy to operate in order to consistently and efficiently perform the stated functions thereof.

In accordance with the invention, the foregoing and other objects, features and advantages thereof appearing in the following detailed description of an illustrative embodiment, are achieved by providing a tool comprising a hollow, elongated body having a rod extending rotatably therethrough. The hollow body is formed with a radial disc adjacent one end dimensioned to fit loosely within the pipe section and liner and a similar disc is provided with a central, threaded aperture through which the adjacent end of the rod extends. The confronting faces of the discs are oppositely conical, at least in their outer portions, and a first resilient ring is mounted between the discs and engages the conical face portions so that, when the rod is rotated with respect to the hollow body to cause relative axial movement of the discs, the first resilient ring is radially expanded into firm engagement with the liner within the pipe section. The hollow body is further formed with a radial flange at a location spaced axially from the disc on the hollow body and a sealing head is axially slidable on the hollow body at the side of the flange remote from the disc, with a second resilient ring being disposed between the flange and head to expand radially in response to the introduction of compressed air in the space radially inside of the second ring. When the head is moved axially toward the flange on the hollow body, the second resilient ring is urged into sealing engagement with the confronting faces of said head and said flange on the hollow body. The second resilient ring is formed so that the compressed air acting thereagainst urges the sides of the ring into sealing engagement with the confronting surfaces of the head and flange during the initial radial expansion of the ring which flares-out the projecting end portion of the liner against the face of the flanged end of the pipe section. However, when the second resilient ring has been radially expanded to a substantial extent, it is distorted to destroy the sealing action, at least against the flange, so that compressed air blows-out past the flared end portion of the liner to drive the latter around the outer edge of the flange at the end of the pipe section. In order to effect rotation of the rod and axial movement of the head, a handle is pivotally mounted on the rod for swinging relative to the latter about a diametrically extending axis located at the end of the rod remote from the threaded end thereof, and the handle is formed with a cam-like hub which acts against a member bearing axially upon the head. The cam-like hub of the handle is dimensioned so that, when the handle is extended radially with respect to the axis of the rod for convenience in rotating the latter, the head and body flange are spaced apart by a normal or relatively large distance, and when the handle is rocked to a position in substantial axial alignment with the rod, the cam urges the follower member and head in the direction toward the body flange to seal the second resilient ring between the head and body flange.

In order that the invention may be fully understood, an illustrative embodiment thereof is hereinafter described in detail and shown in the accompanying drawings, wherein:

Fig. 1 is an elevational view of a tool embodying the invention shown prior to its insertion in a pipe section having a liner therein;

Fig. 2 is a longitudinal sectional view of the tool shown secured within the lined pipe section;

Figure 3:
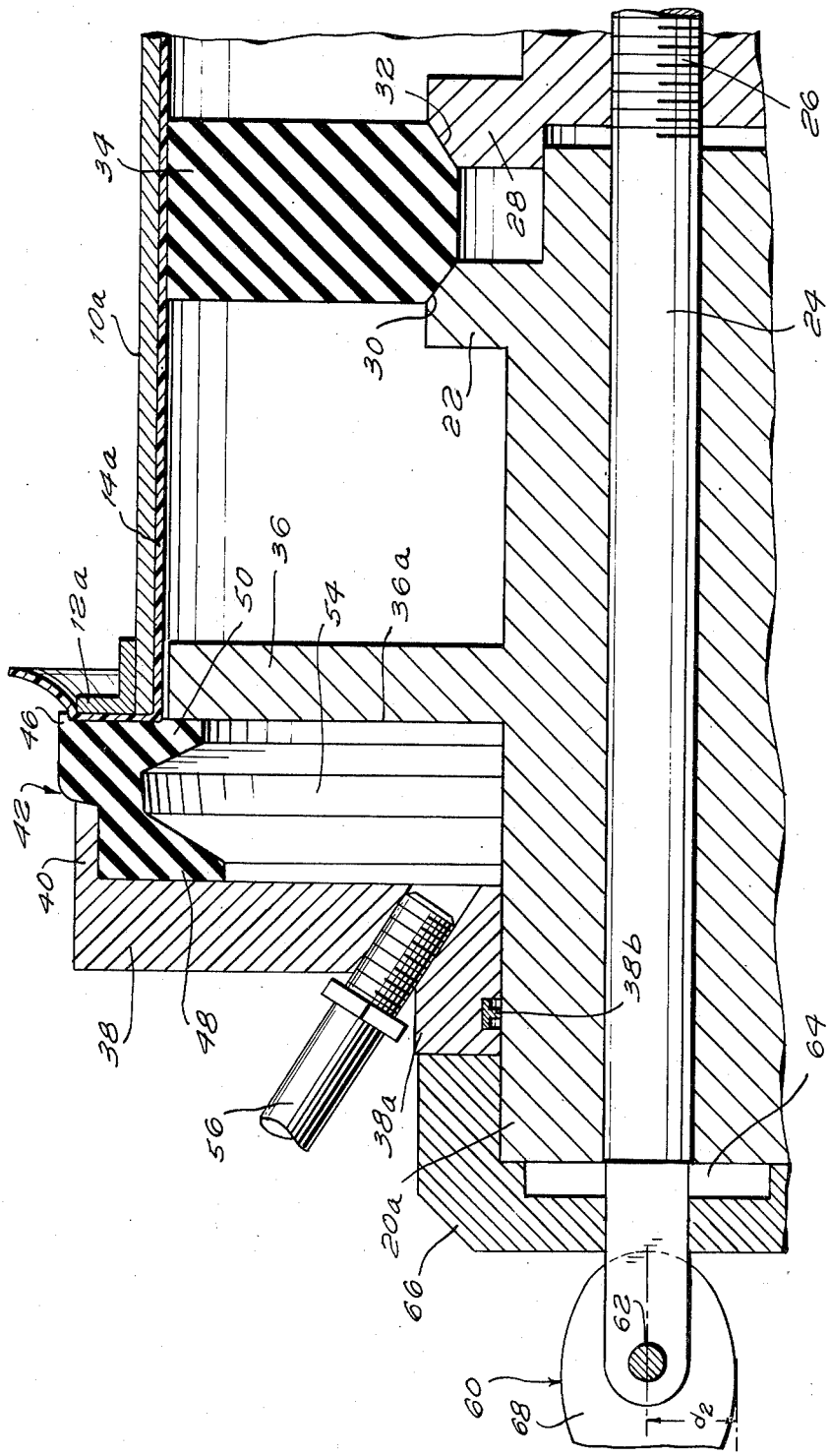
Fig. 3 is a fragmentary enlarged sectional view of a portion of the tool of Fig. 2, but shown following the radial expansion of a resilient ring causing flaring-out of the projecting end portion of the liner.

Fig. 4 is a view similar to Fig. 3, but showing the action of the tool in pneumatically reverting the flared end portion of the liner around the end flange of the pipe section; and Fig. 5 is a diametric, sectional view of a resilient ring member included in the tool of Figs. 1 to 4; and Fig. 6 is a fragmentary sectional view illustrating a joint between successive pipe sections having liners turned back over the end flanges thereof in the manner effected by the tool embodying the present invention.

It has heretofore been proposed to provide light gauge steel pipe with a protective inner lining formed, for example, of polyethylene film in the shape of an extruded tubing. A lining of this character protects the steel pipe from attack by corrosive chemicals and also permits quick, and economical cleaning of the pipe, by removing and replacing the liner, when the pipe is employed for the purpose of handling materials which adhere to the inner surfaces of the pipe, such as, rubber, adhesives and the like.

Usually pipes or conduits of any considerable length are formed of pipe sections which are coupled or joined together at their abutting ends, and the above mentioned tubular liners are assembled, with respect to the related pipe sections, prior to the coupling together of the several pipe sections making up the extended conduit. In order to fully protect the individual pipe sections, even at the end edges thereof, it is preferable to turn back the end portions of the tubular liner over the adjacent ends of the related pipe section so that, when the pipe sections are assembled together, in end abutting relationship, any leakage of the substance handled by the conduit or pipe through the joints between the sections only comes in contact with the protective material of the liners, while the contacting, turned back end porions of the liners of adjacent pipe sections act as seals to prevent, or at least, deter, such leakage.

Usually, as seen in Fig. 6, the joined together pipe sections, indicated at 10a and 10b, are provided with outwardly directly, radial flanges 12a and 12b, respectively at their opposite ends to form at least part of the structure serving to secure together the successive pipe sections in end abutting relationship. However, turning back the end portions of the tubular liners 14a and 14b over the flanges 12a and 12b, respectively, as indicated at 16a and 16b, presents a serious production problem in that the manual accomplishment of the turning back of the liner is time consuming, inefficient, and expensive.

Accordingly, a tool which embodies the present invention is provided for facilitating the turning back of the liners, and is generally identified by the reference numeral 18 (Figs. 1 and 2). The tool 18 includes an elongated, hollow cylindrical body 20 having a disc or radially directed rim 22 (Fig. 2) extending therefrom adjacent one of its ends. An elongated rod 24 of circular cross-section extends through the hollow interior of the body 20 and is rotatable with respect to the latter. The rod 24 is provided with threads 26 thereon at the end projecting from the portion of body 20 having the disc or rim 22 thereon. A disc 28 having a central, tapped aperture is threadably disposed on the threaded end 26 of rod 24 to be axially displaced, with respect to the rim or disc 22, in response to rotation of rod 24 relative to body 20. The confronting faces of the discs 22 and 28, at least in the radially outer portions thereof, are formed as frusto-conical surfaces of revolution, as at 30 and 32, respectively, and a ring 34, formed of a resilient material, such as, rubber and the like, is provided with beveled inner edges to seat upon the conical surfaces 30 and 32. Thus, when the rod 24 is rotated relative to body 20 to cause axial displacement of the disc 28, such axial displacement results in radial expansion and contraction of resilient ring 34.

The ring 34 has a normal or unexpanded diameter which permits the loose insertion thereof into the tubular liner 14a within the pipe section 10a and, following such insertion, the ring 34 is capable of being radially expanded, by rotation of rod 24, in a manner hereinafter described in detail, so that the resilient ring then firmly grips the liner 14a to hold the body 20 of the tool in fixed position with respect to the related pipe section and to prevent displacement of the liner with respect to the pipe section.

The body 20 is also provided with a radial flange 36 having substantially the same diameter as that of the ring 34 in the normal or unexpanded condition of the latter so that the flange 36 may also extend into the liner 14a of the pipe section. The flange 36 is axially spaced from the rim or disc 22 on the body 20 in the direction toward the outer end of the latter so that, when the resilient ring 34 is in gripping engagement with the liner within the pipe section, the outer face 36a of flange 36 lies substantially in the radial plane of the outer or radial face of pipe flange 12a, as seen in Figs. 2, 3 and 4.

A head 38, in the form of a circular plate having a central hub 38a formed with a through-bore, is axially slidable upon the outer portion 20a of the body for controlled displacement toward and away from the flange 36. The hub 38a is provided with an internal, annular packing groove 38b which accommodates a suitable packing or sealing gland or ring. Further, the circular plate portion of head 38 is provided with an axially directed annular flange 40 extending toward the flange 36 on body 20.

A resilient ring mounted between flange 36 and head 38 is generally identified by the reference numeral 42 and is best seen in its normal or undistorted condition in Fig. 5. The ring 42 may be formed of rubber, or any other suitably resilient material, and includes a body portion 44 of generally rectangular cross-section having an axially directed annular lip 46 at the side thereof facing toward flange 36. Further, ring 42 includes spaced apart annular rims 48 and 50 extending inwardly from body 44 and diverging in that direction to define a groove 52 between the rims 48 and 50 having relatively inclined side surfaces. The resilient ring 42 has a normal or unexpanded outer diameter which is substantially the same as that of the flange 36 so that the ring 42 can be inserted into the end portion of liner 14a projecting beyond the radial face of flange 12a, as in Fig. 2. Further, the inner diameter of resilient ring 42 is substantially larger than the outer diameter of portion 20a of the tool body 20, so that an annular space 54 is defined around portion 20a between head 38 and flange 36 and inwardly of ring 42. It will also be noted that the inner diameter of axial flange 40 on head 38 is only slightly smaller than the peripheral diameter of flange 12a and serves to limit the radial expansion of resilient ring 42 (Fig. 3) at the side of the latter engaging head 38.

The resilient ring 42 is radially expanded by compressed air supplied to the space or chamber 54 to act outwardly against the inner surface of ring 42. The compressed air is supplied from a suitable source (not shown) through a tube 56 having a coupling at its end which is received in a suitable port 58 extending through the head 38 and opening into space 54 inwardly of ring 42. The supplying of compressed air through tube 56 to space 54 may be controlled by suitable conventional valves (not shown).

Prior to the introduction of compressed air into the space 54, to effect radial expansion of resilient ring 42, head 38 is axially displaced along body portion 20a toward flange 36 so that the distance between the confronting faces of head 38 and flange 36 is less than the distance between the inner edges of the diverging outer faces of rims 48 and 50 of resilient ring 42, so that such rims are sprung toward each other, as shown in Figs. 2 and 3, and provide a good sealing contact with the faces of head 38 and rim 36. Further, when compressed air is supplied to space 54, the compressed air initially acts against the inclined side surfaces of groove 52 in resilient ring 42 and tends to urge the rims 48 and 50 into even tighter sealing engagement with confronting surfaces of head 38 and flange 36, respectively.

As resilient ring 42 is pneumatically expanded in the radial direction from its original position, shown in Fig. 2, to the expanded position, shown in Fig. 3, the end portion of liner 14a engaging over the outer periphery of ring 42 is flared radially outward against the radial face of flange 12a. In the expanded condition of resilient ring 42, the annular lip 46 thereof is disposed outwardly of the periphery of flange 12a, as shown in Fig. 3, to urge the flared end portion of the liner around the periphery of flange 12a.

When the radial expansion of resilient ring 42 is continued beyond the condition shown in Fig. 3, the portion of that ring adjacent flange 36 bulges radially between the edge of flange 40 and the flange 12a of the pipe and is distorted, as shown in Fig. 4, so that the radially inner edge of rim 50 of ring 42 becomes generally frusto-conical and tapers in the direction away from flange 36, whereby the compressed air acting against said radially inner edge provides a force represented by the arrow A which has a component in the axial direction away from the flange 36. This axial component of the force A separates the rim 50 of resilient ring 42 from the confronting faces of flange 36 and of the turned back liner so that the compressed air within space 54 is then free to blow out past rim 50 and the lip 46 and is deflected by the latter in the direction toward the outwardly flared end portion of the liner 14a, as indicated by the arrow B, to complete the turning back of the flared end portion around the periphery of flange 12a.

In the preferred embodiment of the invention illustrated in the drawing, a single member, in the form of a handle 60, serves the dual function of controlling the rotational movement of rod 24, which in turn controls the radial expansion and contracting of resilient ring 34, and of controlling the axial movement of head 38, which in turn determines the effectiveness of the air seal between resilient ring 42 and the flange 36 and head 38. As seen in the drawing, handle 60 is pivotally mounted upon a diametrically extending pin 62 carried by the end of rod 24 projecting from body portion 20a. Axial movement of rod 24 in one direction is resisted by the engagement of disc 28 against resilient ring 34, while axial movement of the rod 24 in the other direction is resisted by a collar 64 formed on the rod 24 and bearing against the end face of body portion 20a. A cup shaped member 66 engages over the end of body portion 20a and is axially slidable on the latter to bear axially against the hub 38a of head 38. The pivoted end portion of handle 60 is bifurcated, and the bifurcated portions 68 thereof are cam-shaped so that the dimension $d_1$ (Fig. 4), measured longitudinally from the swinging axis of the handle to the periphery of the portion 68, is greater than the dimension $d_2$ (Fig. 3) measured laterally from the swinging axis of the handle to the periphery of the cam-shaped portion 68. Thus, as the handle 60 is pivotally displaced from a radially extending position (Figs. 1 and 2) to a position (Figs. 3 and 4) in which the handle 60 is substantially in axially alignment with the rod 24, the cup-shaped member 66 is displaced axially on portion 20a of tool body 20 and correspondingly displaces the head 38 axially toward flange 36.

In employing the above-described tool 18 for the stated purposes, the handle 60 is initially disposed in its radially extending position (Figs. 1 and 2) and the rod 24 is thereby rotated in the direction moving disc 28 axially away from rim 22 in order to permit radial contraction of the resilient ring 34 to an extent sufficient to permit insertion of that ring into the liner 14a within pipe section 12a. During such rotation of rod 24, corresponding rotation of disc 28 will be resisted by the frictional engagement of the surface 32 thereof with the resilient ring 34. In the event that such frictional engagement is not sufficient to resist the rotation of disc 28, any other suitable and conventional means may be employed for that purpose, such as, for example, mating axial splines (not shown) provided on the disc 28 and on the adjacent end of body 20. After ring 34 has been inserted within the tubular liner, handle 60 is manipulated to effect rotation of rod 24 in the direction moving disc 28 axially toward rim 22 for effecting radial expansion of ring 34 into firm contact with the tubular liner. Such engagement of ring 34 with the tubular liner serves to positively position the tool 18 with respect to the pipe section and to prevent displacement of the liner relative to the pipe section during the turning back of the end portion of the liner. When the tool has been firmly positioned with regard to the pipe section, in the manner described above, handle 60 is pivoted through 90° to the position in axial alignment with rod 24 (Figs. 3 and 4) so that the cam shaped portions 68 act against the slidable, cup shaped member 66 to effect axial movement of the latter, and of the head 38, in the direction toward flange 36, thereby causing sealing engagement between ring 42 and head 38 and flange 36, and then compressed air is admitted to space 54 through the tube 56 to radially expand resilient ring 42 until the ring has come into contact with the retainer flange 40 on head 38. During such radial expansion of resilient ring 42, the latter causes the projecting end portion of liner 14a to flare outwardly (Fig. 3) and, when the ring 42 has been fully expanded, the annular lip 46 thereof is disposed outwardly of the periphery of flange 12a and urges the outwardly flared portion of the liner around the periphery of flange 12a. As previously described, further radial expansion of the resilient ring 42 distorts it, as shown in Fig. 4, to permit the escape of compressed air past the ring 42, while the lip 46 of the ring deflects the blown-out air in the direction against the outwardly flared end portion of the liner to complete the turning back of the end portion over the flange 12a. Finally, the supplying of compresed air to space 54 is discontinued, and the handle 60 is returned to its original position so that ring 42 is free to contract radially inward. Then the handle 60 is manually turned to rotate rod 24 in the direction producing radial contraction of resilient ring 34, thereby freeing the latter from engagement with the tubular liner and permitting removal of the tool 18 from its operative position within the pipe section.

While a particular embodiment of the present invention has been illustrated in the drawings, and described in detail herein, it is to be understood that the present invention is not limited to that specific embodiment, and that various changes and modifications may be effected therein without departing from the scope or spirit of the invention as defined in the appended claims.

What is claimed is:

1. A tool of the described character for turning back the end portion of a tubular liner onto the flanged end of a pipe section receiving the liner; said tool comprising first and second resilient rings mounted in axially spaced apart and aligned relationship, means for radially expanding said first ring within the pipe section into firm contact with the liner at a position locating said second ring within an end portion of the liner projecting from the pipe section, means for radially expanding said second ring so that the latter flares-out the projecting end portion of the liner against the adjacent flanged end of the pipe section, and means directing a flow of compressed air past said second ring and against the flared-out end portion of the liner to assist in turning back said flared-out end portion onto the flanged end of the pipe section.

2. A tool of the described character for turning back an end portion of a tubular liner onto the flanged end of a pipe section receiving the liner; said tool comprising a resilient ring, means for locating said ring within an end portion of the liner projecting from the pipe section, means for radially expanding said ring so that the latter flares-out the projecting end portion of the liner against the adjacent flanged end of the pipe section, and means directing a flow of compressed air past said ring and against the flared-out end portion to assist in turning back the latter onto the flanged end of the pipe section.

3. A tool of the described character for turning back an end portion of a tubular liner onto the flanged end of a pipe section receiving the liner; said tool comprising a resilient ring, means defining a chamber for compressed air radially inward of said ring, means for locating said ring within an end portion of the liner projecting from the pipe section so that, when compressed air is supplied to said chamber, said ring is radially expanded thereby to flare-out the projecting end portion of the liner against the adjacent flanged end of the pipe section, and means limiting the radial expansion of said ring at only one side of the latter to cause distortion of said ring as the latter is radially expanded, so that the distortion of said ring eventually permits the blow-out of compressed air from said chamber past said ring and against the flared-out end portion so that the latter is thereby turned-back onto the adjacent flanged end of the pipe section.

4. A tool of the described character according to claim 3; wherein said means for locating the first mentioned resilient ring includes another resilient ring, means mounting said other ring in axial alignment with said first mentioned ring and spaced from the latter so that said other ring can be disposed within the liner at a position spaced from the projecting end portion thereof, and means for radially expanding said other ring so that the latter bears tightly against the liner within the pipe section to securely locate the tool with respect to the pipe section and to prevent movement of the liner relative to the pipe section.

5. A tool of the described character according to claim 4; further comprising means for initially effecting sealing engagement of the first mentioned ring with said chamber defining means, and common control means for actuating said means initially sealing the first mentioned ring and said means for radially expanding said other ring.

6. A tool of the described character for turning back an end portion of a tubular liner onto the flanged end of a pipe section receiving the liner; said tool comprising a hollow, elongated body having a radial rim adjacent one end, a rod extending through said body and rotatable relative to the latter, a disc threaded on the end of said rod extending from said one end of the body, said disc and radial rim having at least the radially outer portions of the confronting faces thereof formed as frusto-conical surfaces of revolution, a first resilient ring mounted between said frusto-conical portions of the confronting faces to be radially expanded into tight engagement with the liner within the pipe section in response to rotation of said rod relative to said body and disc, a radial flange on said body and spaced axially from said rim, a head member on said body at the side of said flange facing away from said one end of the body, a second resilient ring disposed between said head and flange around said body so that a chamber for compressed air is defined radially inward of said second ring, and means for admitting compressed air to said chamber so that said second ring is thereby radially expanded within an end portion of the liner projecting from the pipe section to flare-out the projecting end portion against the adjacent flanged end of the pipe section, said head member having means thereon engageable with the adjacent side of said second ring to limit the radial expansion of said adjacent side so that, as the radial expansion of the second ring continues, the latter is distorted to a point where the compressed air in said chamber separates said second ring from said flange around the body to permit the blow-out of compressed air therebetween against the flared-out end portion of the liner and the latter is thereby turned back over the adjacent flanged end of the pipe section.

7. A tool according to claim 6; wherein said second ring has an axially directed rim along the periphery thereof at the side facing toward said flange of the body to urge the flared-out end portion of the liner around the periphery of the flanged end of the pipe section after said second ring has been radially expanded.

8. A tool according to claim 6; wherein said head member is axially slidable on said body for movement toward and away from said flange, and further comprising means for axially displacing said head member toward said flange to initially seal said second ring against said head member and said flange prior to the admission of compressed air into said chamber.

9. A tool according to claim 8; wherein said second ring has an axially directed rim along the periphery thereof at the side facing toward said flange on the body to urge the flared-out end portion of the liner around the flanged end of the pipe section and to direct the blown-out compressed air against the flared-out end portion.

10. A tool according to claim 8; further comprising common control means for effecting rotation of said rod and for actuating said means axially displacing said head member.

11. A tool according to claim 8, further comprising a handle pivotally mounted on said rod at the end of the latter projecting from the other end of said body for swinging about a diametrically extending axis between a first radially extending position substantially in axial alignment with said rod, said handle, when in said first position, being manually actuatable to effect rotation of said rod, and wherein said means for axially displacing the head member includes radial cam means on said handle, and follower means engaged by said cam means and bearing axially against said head member to translate pivoting movement of said handle and cam means into axial displacement of said head member, said radial cam means being formed so that pivoting of said handle from said first position to said second position thereof produces axial movement of said head member in the direction toward said body flange.

12. A tool according to claim 8; wherein said second resilient ring has an annular, inwardly opening groove in the inner surface thereof and formed with relatively inclined sides so that, prior to distortion of said second ring, compressed air in said chamber acts against the inclined sides of said groove to urge said second ring into sealing engagement with the confronting faces of said head member and body flange.

References Cited in the file of this patent
UNITED STATES PATENTS

| | | |
|---|---|---|
| 2,306,018 | Fentress | Dec. 22, 1942 |
| 2,312,993 | Stephens | Mar. 2, 1943 |
| 2,333,120 | Parker | Nov. 2, 1943 |
| 2,608,501 | Kimble | Aug. 26, 1952 |